(12) United States Patent
Theopold et al.

(10) Patent No.: US 10,668,739 B2
(45) Date of Patent: Jun. 2, 2020

(54) METHOD FOR MONITORING A TRANSFERRING PROCESS

(71) Applicant: KHS GmbH, Dortmund (DE)

(72) Inventors: Alexandra Theopold, Dortmund (DE); Sascha Koers, Bergkamen (DE); Markus Reiniger, Mönchengladbach (DE)

(73) Assignee: KHS GmbH, Dortsmund (DE)

( * ) Notice: Subject to any disclaimer, the term of this patent is extended or adjusted under 35 U.S.C. 154(b) by 0 days.

(21) Appl. No.: 16/463,633

(22) PCT Filed: Oct. 18, 2017

(86) PCT No.: PCT/EP2017/076642
§ 371 (c)(1),
(2) Date: May 23, 2019

(87) PCT Pub. No.: WO2018/103934
PCT Pub. Date: Jun. 14, 2018

(65) Prior Publication Data
US 2019/0375213 A1    Dec. 12, 2019

(30) Foreign Application Priority Data

Dec. 7, 2016 (DE) .......................... 10 2016 123 695

(51) Int. Cl.
| | |
|---|---|
| *B41J 3/407* | (2006.01) |
| *B41J 3/54* | (2006.01) |
| *B65B 35/16* | (2006.01) |
| *B65B 43/54* | (2006.01) |
| *B65B 61/00* | (2006.01) |
| *B65G 47/90* | (2006.01) |

(52) U.S. Cl.
CPC ............. *B41J 3/4073* (2013.01); *B41J 3/543* (2013.01); *B65B 35/16* (2013.01); *B65B 43/54* (2013.01); *B65B 61/00* (2013.01); *B65G 47/90* (2013.01); *B65G 2201/0244* (2013.01); *B65G 2203/042* (2013.01)

(58) Field of Classification Search
CPC . B41J 3/4073; B41J 3/543; B41J 2/01; B65G 2201/0261; B65G 2201/0244; B65G 29/00; B65G 2201/0235; B65G 2203/042; B65B 47/90; B65B 43/52; B65B 61/00; B65B 43/54; B65B 35/16
See application file for complete search history.

(56) References Cited

U.S. PATENT DOCUMENTS

2012/0031736 A1 * 2/2012 Swinderman .......... B65G 43/02
                                                198/498
2014/0298100 A1 * 10/2014 Grimm ................... B65B 57/00
                                                714/37

FOREIGN PATENT DOCUMENTS

| DE | 10 2007 050 490 | 4/2009 |
|---|---|---|
| DE | 10 2011 112 106 | 2/2013 |
| JP | 2002 140090 | 5/2002 |

* cited by examiner

*Primary Examiner* — Jannelle M Lebron
(74) *Attorney, Agent, or Firm* — Occhiuti & Rohlicek LLP

(57) ABSTRACT

Using an acoustic signal to monitor a transfer of a puck that is holding and centering a container as it is being transferred from a first to a second transport-element includes using a sensor to capture an acoustic signal generated by the transfer. This acoustic signal indicates that the puck has been received at a treatment station associated with said second transport-element.

25 Claims, 4 Drawing Sheets

METHOD FOR MONITORING A TRANSFERRING PROCESS

RELATED APPLICATIONS

This is the national stage under 35 USC 371 of international application PCT/EP2017/076642, filed Oct. 18, 2017, which claims the benefit of the Dec. 7, 2016 priority date of German application 10 2016 123 695.0, the contents of which are herein incorporated by reference.

FIELD OF INVENTION

The invention relates to a method for monitoring the transfer of a holding-and-centering unit between transport elements of a container-treatment machine, and to a container-treatment machine with such a monitoring of a transferring process.

BACKGROUND

Directly printing on a container is a multi-step process in which a container enters and leaves several container-processing machines. In some of these machines, there exist elements that engage a container and move it from one processing machine to the next.

These engagement devices tend to wear over time. Eventually, such wear causes a defect. A defect that arises in operation can result in an incorrect transfer between container-treatment machines. This can damage the apparatus.

SUMMARY

An object of the invention is to provide a method for monitoring a transfer process between transport elements of a container-treatment machine in such a way as to identify a need for maintenance or repair or to provide data for forensic analysis in the aftermath of an event that damages the machine.

In one aspect, the invention features a method that includes using an acoustic signal to monitor transfer of a puck that is holding and centering a container during the transfer. The transfer is from a first transport-element to a second transport-element that follows the first transport-element along a transport direction.

Monitoring the transfer comprises using a sensor to capture a first acoustic signal and evaluating a first electrical signal that represents the first acoustic signal. The first acoustic signal is one that has been generated by the transfer and is thus indicative of the puck having been received at a treatment station associated with the second transport-element.

An advantage of the method arises from the ability to identify defects or abnormalities in the transfer at an early stage. This allows one to proactively take certain measures to avoid damage due to incorrect transfer. By taking such proactive measures, it is possible to prevent or reduce high repair costs and machine downtimes. The early warning provided by the method permits pre-emptive machine maintenance and repair before the defect has developed to the point at which machine damage is likely.

Some practices feature comparing a measured signal to a reference signal. The reference signal in this context represents a signal that would be detected when a fault-free transfer takes place. In typical practices, a reference signal would be derived from, for example, an amplitude and/or an amplitude sequence, or also a frequency and/or a frequency range of the measured signal or of a signal derived from the measured signal, and which is received and stored after taking into operation or regularly at the production start of the machine. Such a comparison results in a technically simple way to identify defects or abnormalities.

Some practices of the invention feature defining a tolerance range. This tolerance range forms a desired reference range for the measured signal. If the measured signal leaves the reference range, one can infer that an atypical transfer of the puck and its holding and centering unit has occurred. Practices include those in which the tolerance range specifies an amplitude range, a frequency range, and a time amplitude sequence range of the measured signal, or of a signal derived from any of the foregoing.

In some practices, the tolerance range defines a region of a two-dimensional space in which one dimension is amplitude and the other is time. In other practices, the tolerance range defines a region of a two-dimensional space in which one dimension is amplitude and the other is frequency. In yet other practices, the tolerance range defines a volume in a three-dimensional space in which the dimensions are time, frequency and amplitude.

Some practices of the invention feature forming a reference signal and a tolerance range from a correlation with one or more parameters of the device or components of the device. Examples of suitable correlating parameters include the reference incremental value, i.e. the angular position of the main drive of the machine, the point in time or time frame during which a measured signal, such as a frequency or sound of which the type or strength is expected, a dependency of the measured signal of the machine on the rotation speed of the machine and/or of the circulating speed of the holding and centering units, etc.

Some practices of the invention feature generating the reference signal in-situ. Among these are practices that include comparing the measured signal from a treatment station with the mean value of the measured signal from all the treatment stations or from a group of different treatment stations. There are two methods for determining a reference signal that is produced dynamically or in-situ.

The first method of dynamically generating a reference signal in-situ is to compare the measured signal at a treatment module that is in the midst of interacting with a puck's holding and centering unit with the a mean measured signal obtained by capturing acoustic signals from a set of treatment modules that were in also in the midst of interacting with different pucks having different holding and centering units. This first method is useful for detecting an abnormality in a treatment station.

The second method of dynamically generating a reference signal in-situ is to compare a measured signal from a treatment station that interacts with a puck only with measured signals from those treatment stations that interacted with the same puck. This second method is useful for detecting an abnormality in a puck or its holding-and-centering unit.

The foregoing two methods are not mutually exclusive. It is therefore quite possible to carry out the first and second methods in parallel.

Ideally, when evaluating the mean value as described herein, it is preferable to omit consideration of those treatment stations for which the measured values already exhibit at least a drift and those in which the measured values approximate or exceed at least one reference value, target value, or value range.

As used herein, a treatment station's "measured signal" is to be understood as any signal that is obtained in connection with the receiving and holding of a holding and centering unit and/or that is triggered by this event and that can be detected by sensory element.

An evaluation as described herein automatically accommodates variable production conditions, such as temperature changes. This makes monitoring puck transfer more independent from the production conditions.

The correlation can take place within a range of times, hereinafter referred to as a "temporal range." The amplitude and phase difference between the transfer signals are determined, whereby, for example, a cross-relation can be used as the correlation method.

Some practices of the invention include comparing the measured signal with a reference signal during one or more temporal ranges. As a result it is possible to acquire a longer duration of an acoustic signal or several acoustic signals following one another in a temporal sequence. This provides information on the initial impact and aftershocks thereof in the form of additional impacts and rattles. This additional information promotes effectiveness of the monitoring method.

Other practices of the invention include inspecting the measured signal in the frequency domain. This includes comparing the spectrum of the measured signal with the spectrum of the reference signal within a frequency range. This promotes recognition of periodically recurring acoustic signals.

Yet other practices include monitoring the transfer process by simultaneously including the measured signal in both the time domain and the frequency domain. This allows for both the time behavior as well as the frequency behavior to be integrated into the assessment of the transferring process.

Some practices of the invention include filtering the measured signal before comparing it with the reference signal. A variety of filters can be used. Particularly useful are digital filters, including finite impulse response filters. This filtering step makes it possible to suppress interference frequency ranges or background noises by filtering out interfering frequency components.

Some practices of the invention include capturing several acoustic signals simultaneously or almost simultaneously. One way to carry this out is to arrange different sensors in different locations on the container treatment machine.

Among these practices are those that include providing a sensor at each treatment station. Doing so permits passing a first puck from a first treatment station to a second treatment station while transferring a second puck from the second treatment station to a third treatment station. At any instant, a transport element will be receiving a first puck while handing over a second puck. Since handing a puck over generates essentially no acoustic signal, any received signal can safely be assumed to result from receiving the first puck.

In some practices of the invention, the measured signal is allocated to a particular transport element. Among these are practices in which the measured signal is allocated to a particular angular segment of the transport element or a treatment station on the transport element. This makes it possible to identify a treatment station at which an abnormality was detected.

Other practices include mapping a measured signal to a particular puck so that it becomes possible to identify a particular puck at which an abnormality occurred.

Also among the practices of the invention are those that include conveying the puck back to a container inlet so that the puck can pick up a new container and make another pass through the container-treatment machine, this time with a new container. The time it takes for a puck to start at the inlet, run through the container-treatment machine, and then return to the inlet different from the time it takes for one revolution of a transport element. Thus, by analyzing the frequency at which an abnormality is repeated, it is possible to distinguish between a defect in a receiver and a defect in a puck's holding-and-centering unit.

According to one exemplary embodiment, the signal sequence and/or the signal amplitude of the measured signal or of a signal deriving therefrom is evaluated. It is also possible for the spectral position of the measured signal or of a signal deriving therefrom to be evaluated, i.e. its frequency evaluated. As a result, it is likewise possible for conclusions to be drawn regarding the causes of the abnormality or irregularity.

Some practices feature detecting first and second acoustic signals separated in time. The first signal occurs immediately upon the puck's transfer. The second signal occurs shortly thereafter and carries information about aftershocks. As a result, it is possible to use both the first and second signals to monitor the transfer of a puck.

In another aspect, the invention features a container treatment machine comprising first and second transport elements, each of which rotates. The second transport element follows the first transport element in a transport direction.

The transport elements have treatment stations, each of which receives a puck that carries a holding and centering unit. The transport elements are configured so that a puck can transfer from the first transport element to the second transport element within a transfer area.

A sensor at the transfer area captures an acoustic vibration that results from the transfer. The acoustic vibration can be a vibration of a solid material or of the surrounding air.

An evaluator receives a signal derived from the acoustic signal and analyzes it in an effort to identify abnormalities or defects in the transfer process. As a result, it becomes possible to detect any defects associated with the puck's transfer and to take measures to correct the defect.

In some embodiments, the sensor moves with the transport element. Among these are those in which the sensor is arranged on the transport element.

In other embodiments, the sensor remains stationary and the transport elements move relative to the sensor in such embodiments, the sensor is arranged at the transfer area. Among these embodiments are those in which the sensor pivots about an axis to be able to follow a puck as the transport element carries it through a range of angles.

There exist a variety of ways to implement the sensor. In some embodiments, the sensor comprises one or more directional microphones that are directed towards the transfer area. This is particularly advantageous for stationary sensors arranged at the transfer area.

In some embodiments, a sensor that moves with the transport element is assigned to one or more treatment stations so as to capture acoustic signals that occur upon transfer of a puck to a particular treatment station or set of treatment stations. As a result, it is possible to identify the treatment station or group thereof at which a defect may have arisen.

In other embodiments, the sensor is implemented to illuminate a vibrating structure with radiation of a known wavelength and to detect variations in wavelength of radiation reflected from that structure as a result of Doppler shift. Among such embodiments are those in which the sensor comprises a laser vibrometer.

In some embodiments, the sensor is on a plate arranged inside the treatment station. This results in a simple and economical implementation of the sensor in the treatment station.

In an alternative embodiment, the sensor is on a load-bearing part of the treatment station or on the receiver that receives the puck. This embodiment makes it possible to detect structure-borne sound inside the treatment station. This structure borne sound is a mechanical wave that propagates in a solid material.

Yet other embodiments rely on a plurality of sensors that simultaneously capture multiple acoustic signals that arise during a transfer. Embodiments include those in which the sensor is implemented by a combination of structure-borne sound sensor and a microphone.

Some embodiments also feature a filter that filters out frequency components that may interfere with proper evaluation of the signal. These frequency components may have arisen as a result of fundamental component vibrations and/or interfering background noises.

Embodiments include those in which a structure-borne sound implements the sensor. Such embodiments are able to detect sound waves that propagate through solid structures, such as component parts of the treatment station, including, for example, a receiver that receives a puck.

Other embodiments include those in which a microphone implements the sensor. Such microphones include directional microphones. Such embodiments make possible the detection of airborne vibrations.

Some embodiments include a central evaluator that evaluates signals obtained from many different sensors. A central evaluator is able to exploit signals from different sensors makes it possible to more accurately infer the cause of a defect and to identify its origin. In particular, a central evaluator makes it possible to distinguish between a defect in a puck and a defect in a treatment station.

In other embodiments, evaluation takes place in several steps using evaluation modules that have been assigned to different treatment stations or transport elements. A first step in such cases is a local evaluation by a local sensor and a second stage uses the ensemble of local evaluations to draw more general inferences. The first step is carried out by evaluators associated with treatment, stations or transport elements and the second step is carried out by a superordinated evaluation unit in communication with the local evaluation units.

In some embodiments, the evaluator either includes a memory or connects to a memory. In either case, the memory stores data regarding fault analysis. Such data makes it possible to carry out forensic analysis. For example, if an incident causes machine damage, such data makes it possible to trace backwards to identify an acoustic signal that may have been the initial indication of the risk of such damage.

In other embodiments, the evaluator issues a message or an alarm upon having identified an abnormality or irregularity in a puck transfer. Such a message is useful for indicating a need for machine maintenance or machine repair and for providing information indicative of the required activity based on a known defect profile or by identifying a defective treatment station or puck.

In some embodiments, the container-treatment machine is a printing machine that prints on containers. Among these embodiments are inkjet printers having inkjet print heads.

As used herein, "container-treatment machine" refers to machines that treat containers, for example, by printing, drying, and inspecting.

As used herein, terms such as "defect" or "defective" refer to the manifestation, in either a machine component or a puck, of abnormalities or irregularities that lie outside a tolerance range.

As used herein, "container" includes bottles, cans, and beakers.

As used herein, "essentially" or "approximately" refer to deviations from the exact value by ±10%, preferably by +/−±5%, and/or deviations that are not of significance for function.

Further embodiments, advantages, and possible applications of the invention are also derived from the following description of exemplary embodiments and from the figures. In this context, all the features described and/or represented as images are in principle the object of the invention, alone or in any desired combination, regardless of their compilation in the claims or reference to them. The contents of the claims are also constituent parts of the description.

BRIEF DESCRIPTION OF THE DRAWINGS

The invention is explained in greater detail hereinafter on the basis of the figures, in which.

DETAILED DESCRIPTION

Figure 1:
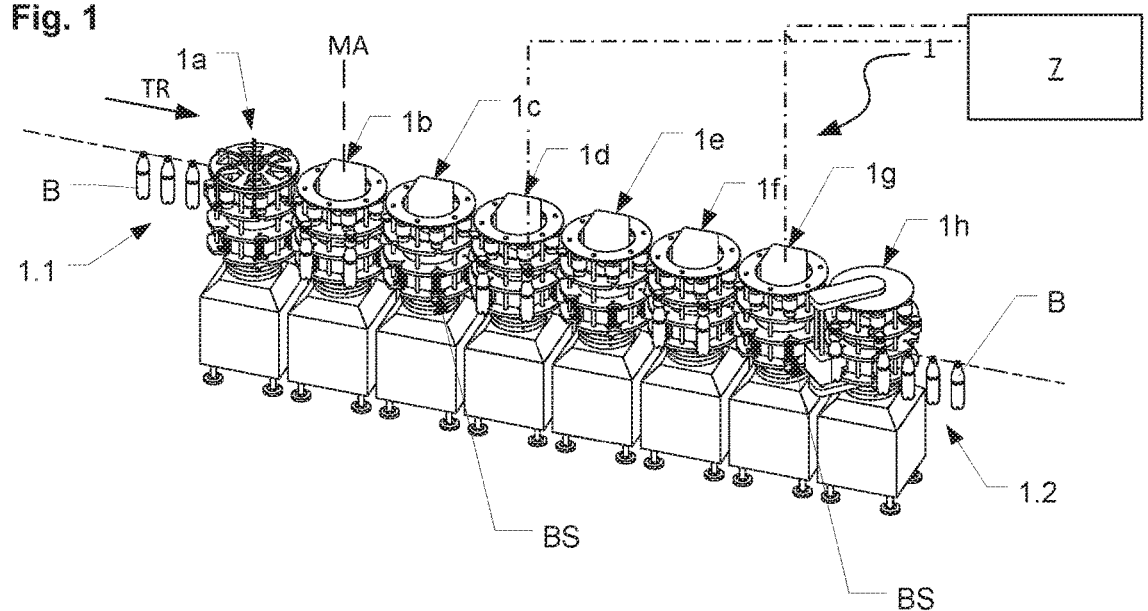
FIG. 1 shows a perspective view of a container-treatment machine that prints on containers.

FIG. 1 shows a container-treatment machine 1 that prints on containers B as they traverse a meandering path between the container-treatment machine's inlet 1.1 and its outlet 1.2. In the illustrated embodiment, the containers B are bottles. The container-treatment machine 1 prints either directly on a container's casing or on a label that has been applied to the casing.

The printing process includes the use of an external transporter to convey upright containers B along a transport direction TR towards the inlet 1.1. Once within the container-treatment machine 1, the containers B move along a transport segment having multiple bends that define a meandering or sinuous path through the container treatment machine. After having been printed upon, the upright container exits the container-treatment machine at the outlet 1.2.

The container-treatment machine 1 includes plural machine units 1a-1h that connect directly to each other along the transport direction TR. Each machine unit 1a-1h includes a transport element 3, 4, 4', best seen in FIG. 2, that is coupled to a drive that rotates it around a vertical machine-axis. Each transport element 3, 4, 4' also includes treatment stations BS along its periphery, of which only two are shown for each transport element 3, 4, 4' in FIG. 2. Each treatment station BS includes function elements that carry out the particular task of the particular machine unit 1a-1h.

In some embodiments, treatment station BS takes the form of a treatment module or treatment segment that is configured to be replaced as a complete unit. This allows one to swap a new module for a defective module by simply plugging it into a slot in the transport element 3, 4, 4' in much the same way that a circuit board in a computer can be swapped in and out of an interface.

The constituents of a particular treatment station BS depend on the function of the particular machine unit in which it is installed. For example, a treatment station BS can be a pre-treatment segment that is used for such functions as sterilizing a container. Or it can be a post-treatment segment that carries out such functions as curing or drying ink or inspecting the printed image.

In other embodiments, a treatment station BS is exchangeable by individual arrangement of function elements on a transport element rather than as a single treatment module.

Each treatment station BS includes a receiver for holding and then releasing a puck 2. The receiver can be seen in FIG. 2 as a cross-hatched region of the treatment station BS that engages a puck 2.

The puck 2 includes a holding-and-centering unit that is configured for holding and centering a container B that is to be printed upon. The puck 2, and in particular, its associated holding-and-centering unit, secures the container B in a detachable manner during rotation of the transport element 3, 4, 4'. Meanwhile, the receiver holds the puck 2 at the treatment station BS so that the container B can be treated as it proceeds along the meandering path through the container-treatment machine 1.

Figure 2:
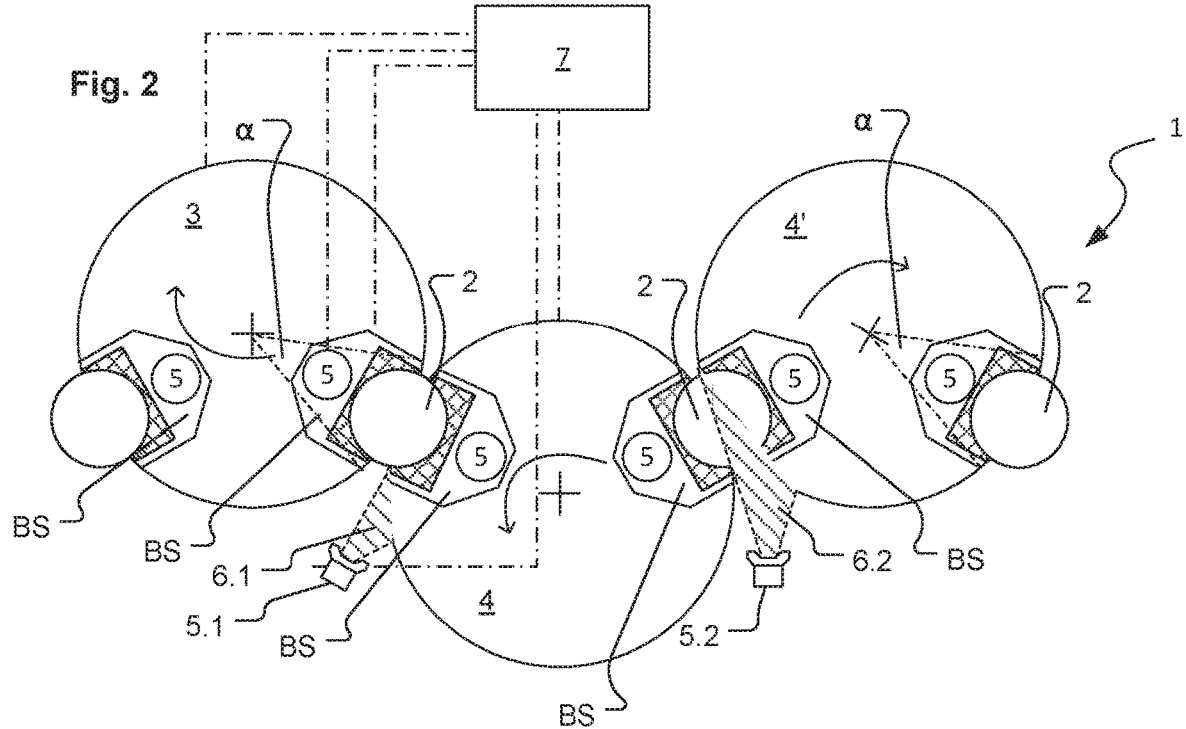
FIG. 2 shows a view, from above, of the process of transferring pucks between treatment stations provided on transport elements.

A transport element 3 of a particular machine unit 1a connects directly to that of an adjacent machine unit 1b, as can be seen in FIG. 2. The transport elements 3, 4, 4' are driven synchronously in opposite directions so that when a container moves from one transport element to the next, its angular velocity vector changes sign. This sign change occurs several times, once with each deflection along the path between the container inlet 1.1 and the container outlet 1.2.

The transfer of a container B from one machine unit 1a to the next 1b results from transferring a puck 2 from one transport element 3, 4 to the next 4, 4'. The puck's holding-and-centering element holds the container B during this transfer. As a result, the puck 2 holds the container B throughout its journey through the container-treatment machine 1.

In addition to holding and centering a container B, a puck's holding-and-centering element also pivots or rotates the container B. This is particularly useful during printing because rotating or pivoting a container B about its axis will expose different parts of the container's casing to a print head.

FIG. 2 shows a first puck 2 being transferred from a first transport-element 3 to a second transport-element 4 and a second puck 2 being transferred from the second transport-element 4 to a third transport-element 4'. The transfer occurs when treatment stations BS of adjacent transport elements face each other.

To carry out the transfer, the treatment station BS that is releasing the puck, hereafter the "handover station," reduces the force that engages the puck 2 to it while the treatment station BS that receives the puck 2, hereafter the "receiving station," simultaneously activates a holding force that causes the puck 2 to be engaged to it.

The transfer of a puck 2 between treatment stations BS does not occur in silence. On the contrary, the transfer generates various sounds, particularly in the area of the receiving station. These sounds provide clues concerning defects or excessive wear, either at the treatment station BS or at the puck 2. The timing of these sounds also provides clues concerning the synchronization between transport elements 3, 4, 4'. These sounds thus provide the basis for a process that identifies faults or other impediments to proper transfer of pucks 2 between treatment stations BS.

As shown in FIG. 2, the apparatus includes sensors 5 that detect acoustic signals that arise during a puck's transfer from a handover station to a receiving station. Examples of suitable sensors 5 include microphones, and in particular, directional microphones. However, it is also possible to detect acoustic vibrations transmitted by the structures themselves. This would be analogous to a human placing his hand on a piano to feel the vibrations. With this in mind, other embodiments of the sensors 5 include structure-borne sensors that detect such acoustic vibrations. Such structure-borne sensors can be placed on a treatment station BS or on a transport element 3.

FIG. 2 also shows first and second sensors 5.1, 5.2 that are implemented as directional microphones. The first sensor 5.1 detects acoustic signals from a first angular range 6.1 that covers a transfer area where the transfer takes place. The second sensor 5.2 detects acoustic signals from a second angular range 6.2 that is somewhat wider than the first angular range 6.1.

In some embodiments, the sensors 5 move with the transport elements 3, 4, 4' with which they are associated. In other embodiments, the sensors 5 are independent of the transport elements 3, 4, 4' and therefore do not move with the transport elements 3, 4, 4'. Instead, they are positioned to receive sounds at selected locations of interest. For example, the sensors 5 can be mounted next to but not on the transport elements 3, 4, 4' in such a way so as to point towards an area where acoustic signals of interest are likely to be generated.

Also among the embodiments are those in which the sensor 5 is integrated into a treatment station BS in such cases, the sensor captures acoustic signals that occur while transferring a puck 2. A suitable location for such a sensor 5 would be on or at a receiver that receives and holds the puck 2 or on a plate or another constituent part of the treatment station BS.

In some embodiments, a sensor 5 captures an acoustic signal during a particular range of times, hereafter referred to as a "temporal range." In such cases, the sensor 5 provides a time-varying electrical output signal that depends on the acoustic signal captured by the sensor 5.

The signals in such cases can be analyzed directly, for example at the sensor itself. In some cases, the sensor 5 transmits its measured signal to an evaluator 7 for further signal processing. In either case, the signal is analyzed to identify evidence of defects or wear and to determine whether the sounds made by the transferring process are within some tolerance.

In some embodiments, the evaluator 7 is a central evaluator to which all sensors 5 are coupled, as suggested by the broken lines in FIG. 2. Alternatively, there exist plural evaluators 7, each one of which carries out evaluation on behalf of fewer than all of the sensors 5. In such cases, it is also possible to have a superordinate evaluator 7 that connects to what would now be subordinate evaluator 7, thus creating a two-level hierarchy of evaluators. The existence of a superordinate evaluator 7 means that data for the entire machine can be collected in one location. The existence of a superordinate evaluator and plural subordinate evaluators also permits creation of a master-slave relationship between the superordinate evaluator and the subordinate evaluators, thus permitting the partitioning of evaluation tasks in a computationally efficient manner.

Figure 3:
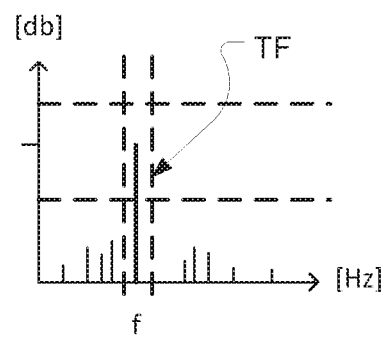
FIG. 3 shows a spectrum of a measured acoustic signal in which the dominant component lies within a tolerance window.
Figure 4:
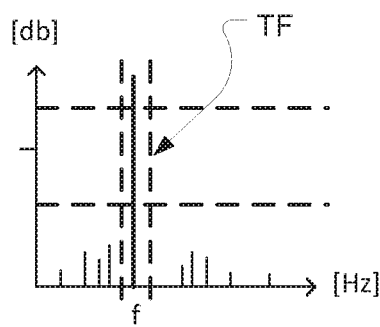
FIG. 4 shows a spectrum of a measured acoustic signal in which the spectrum's dominant component has an amplitude that lies outside the tolerance window.
Figure 5:
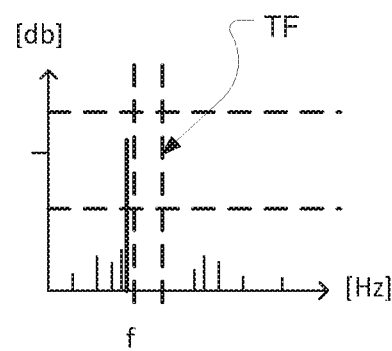
FIG. 5 shows a measured acoustic signal in the frequency domain with a dominant spectral component that lies outside the tolerance window.

FIGS. 3-5 show examples of amplitude spectra of acoustic signals that would be obtained by a sensor 5. Such spectra are typically obtained by applying a Fast Fourier Transform to a time-domain signal obtained by the sensor 5 during a puck's transfer.

As is apparent from FIGS. 3-5, there exists a frequency component whose amplitude is greater than that of all other frequency components. An "f" marks this "dominant component" in each of the figures. The frequency marked "f" shall be referred to herein as the "dominant frequency."

In some cases, the dominant frequency depends on the revolution speed of the transport elements 3, 4. This is because the frequency with which pucks transfer between transport elements 3, 4 depends on this revolution speed.

On either side of the dominant component there exist interfering spectral components. These interfering spectral components arise from other events within the container-processing machine 1 that trigger acoustic signals.

The frequency and amplitude axes define a two-dimensional space. A tolerance window TF, as shown in FIGS. 3-5, defines a subset of this space it should be noted that the spectral components are complex numbers having an amplitude and phase and that only the amplitude is shown in the figures. However, the phase can also be used for signal processing.

In FIG. 3, the dominant component's amplitude and frequency lie within the tolerance window TF. In such a case, the evaluator 7 considers the transfer be a defect-free transfer or a transfer without abnormality. Accordingly, the evaluator does not issue a message indicative of a maintenance requirement or an interference event.

On the other hand, there are cases in which the dominant component will lie outside the tolerance window TF. For example, in FIG. 4, the dominant component's amplitude lies outside the tolerance window TF and in FIG. 5, the dominant component's frequency lies outside the tolerance window TF. In such cases, the evaluator 7 issues an appropriate message.

Some embodiments have two or more tolerance windows TF. In some of these embodiments, a first tolerance-window extends across a frequency range that corresponds to the transport element's revolution speed and the second tolerance window extends across a frequency range that corresponds to the puck's circulation frequency. This circulation frequency is a measure of how long it takes for a puck to circulate through 110 the container-processing machine as it leaves at the container outlet 1.2 and re-enters at the container inlet 1.1 to engage another container and to make another pass through the container-treatment machine.

A puck's abnormal transfer can arise from a defect in the puck 2 or a defect in the way a treatment station BS handles the puck 2. In some embodiments, the evaluator 7 executes a procedure to identify the reason for the abnormal transfer. Among these are embodiments in which the evaluator 7 distinguishes between an abnormal transfer caused by a defect in the puck 2 and one caused by a defect in the treatment station BS.

In some embodiments, the evaluator 7 identifies an abnormality that extends across multiple transport elements 3, 4, 4'. This suggests a defect in the puck 2 rather than in the transport elements. In such cases, the evaluator 7 traces backwards to determine if the abnormality arises from a defective puck 2.

In some cases, the evaluator 7 identifies an abnormality in only one transport element 3 with a frequency that corresponds to the rotation speed of that transport element 3. In such cases, the evaluator 7 infers the existence of a defect at the treatment station BS, and in particular, at a receiver within that treatment station BS.

In some embodiments, the evaluator 7 locates a defective treatment station BS of a transport element 3. One way to achieve this is to encode an identifier in the signal that comes from a treatment station BS so as to uniquely identify the source of that signal. Another way is to identify an angle at which the defect occurred and to identify which treatment station BS was located at that angle at the time the defect was detected.

In such cases, there may be some ambiguity because both a handover station and a receiving station will be present in the same angular range. However, it has been discovered that an acoustic signal indicative of a defect is far more likely to have originated at the receiving station.

Figure 6:
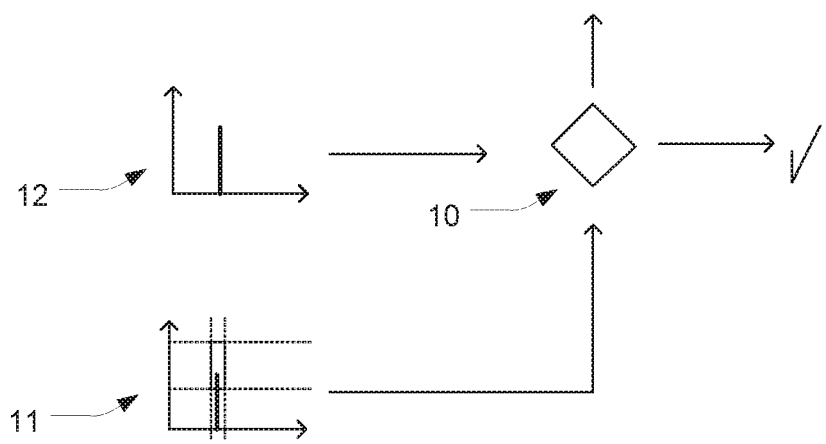
FIG. 6 shows an evaluation method that relies on comparing a reference signal with the measured signal in the frequency domain.

FIG. 6 shows a comparator 10 that receives a measured acoustic signal 11 and a pre-stored reference signal 12. The reference signal 12 corresponds to the same frequency range as the measured acoustic signal 11. In some cases, the reference signal 12 is a signal from a defect-free transfer of a puck 2 into a receiving station BS. Either one or both of the reference and measured signals 12, 11 can be unfiltered or filtered, in the latter case by, for example, a bandpass filter The comparator 10 then compares the measured signal 11 and the reference signal 12. If the extent of deviation is sufficiently small, the comparator 10 recognizes a defect free transfer. Otherwise, the comparator 10 recognizes a defective transfer and sends a suitable message.

In some embodiments, the comparator 10 is a central comparator that is provided at a central evaluator 7. In other embodiments, the comparator 10 is one of several comparators, each of which is located at a sensor 5. In this latter decentralized approach, the comparator 10 is a constituent of an evaluator 7 that then communicates data to a superordinate evaluator 7.

Figure 7:
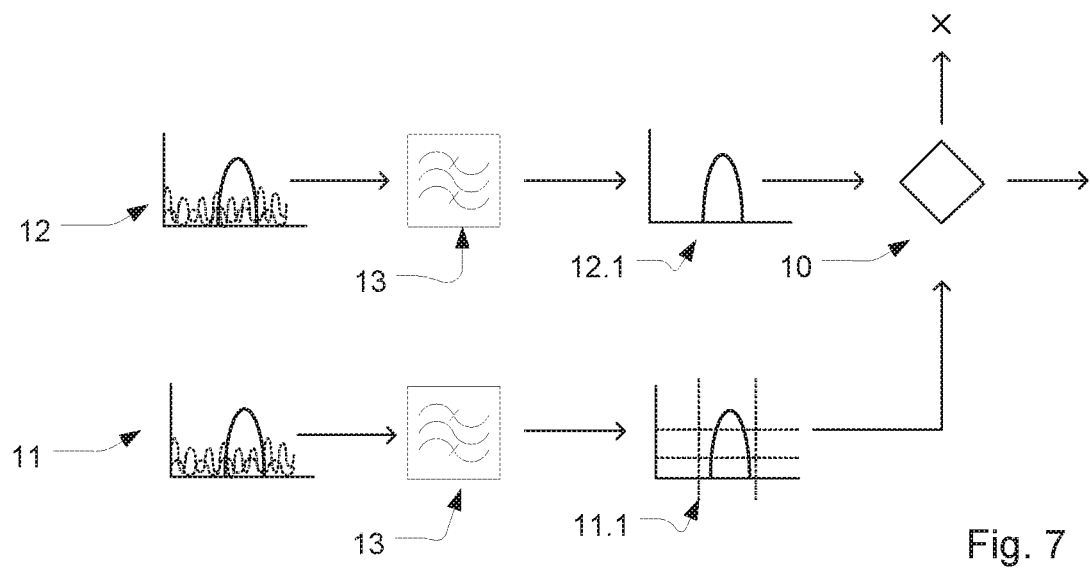
FIG. 7 shows an evaluation method similar to that shown in FIG. 6 but including the use of a filter.

FIG. 7 shows an apparatus that is identical to that in FIG. 6 except for the inclusion of filters 13 for filtering the measured signal 11 and the reference signal 12 to produce a filtered reference signal 12.1 and a filtered measured signal 11.1 A suitable filter is a bandpass filter. Such filters are useful for attenuating background noise including unwanted harmonics.

In some embodiments, the evaluator 7 analyzes the measured signal 11 in both the time domain and its spectral form in the frequency domain. In such a case, there would exist a comparison with a tolerance window or a comparison with a reference signal 12.

Some embodiments capture more than one acoustic signal in connection with the transfer of a puck 2. In some cases, the sensor 5 measures first and second measured signals during the same transfer procedure with these measured signals being offset from each other in time.

Among the embodiments that rely on two measured signals are those that capture the first signal immediately after the puck 2 has been introduced into the receiving station and capture the second signal shortly thereafter. This second signal enables the analyzer 7 to analyze the follow-on vibration pattern or sound pattern. Embodiments include those in which the same sensor 5 captures the first and second signals and those in which different sensors 5 capture the first and second signals.

Suitable examples of sensors 5 include microphones, and in particular directional microphones. Other examples of sensors 5 include structure-borne sound sensors. Such sensors can be screened against other sources of sound.

In some embodiments, it is useful to implement a sensor 5 by fixing first and second directional microphones next to a transfer area where pucks 2 are transferred from the handover station to the receiving station. In this implementation, the first directional microphone points directly at the transfer area to capture the acoustic signal that occurs immediately at the time of transfer. The second directional microphone points in such a way that, within its capture area, it captures run-on sound patterns or vibration patterns that immediately follow the transfer. This can be achieved by pointing the second directional microphone at an angle range through which the puck moves immediately after having left the transfer area.

Figure 8:
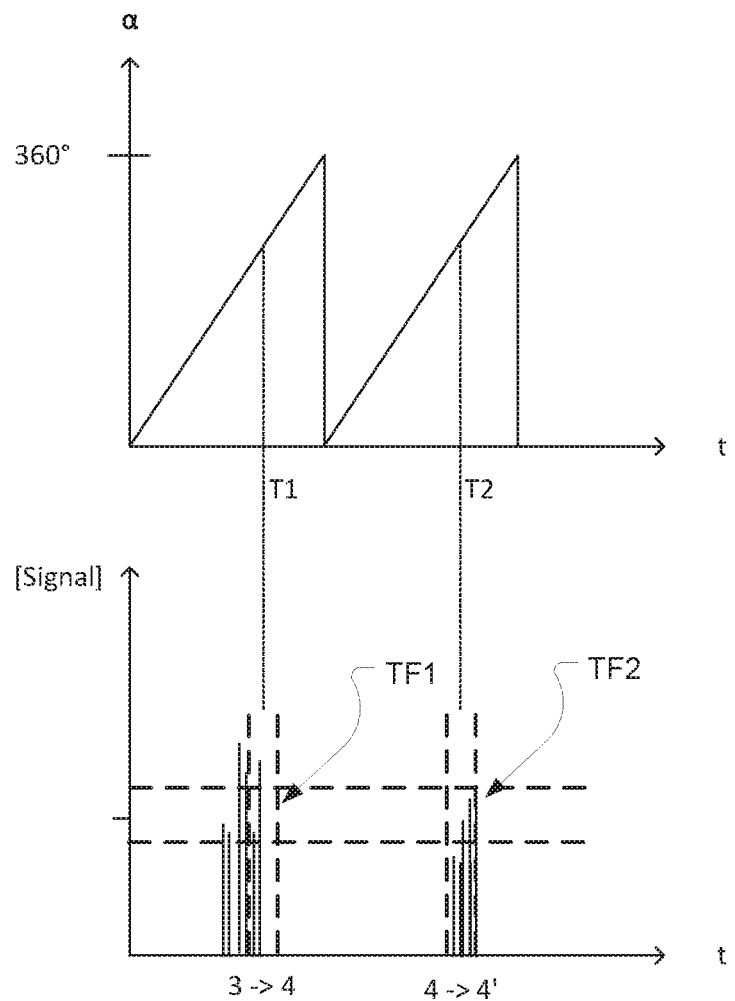
FIG. 8 shows signals arising from the transfer of pucks between two pairs of transport elements.

FIG. 8 shows a way to detect an error in the synchronous operation of a handover station and a receiving station by using an offset in the average times at which transfers are taking place.

The upper graph in FIG. 8 shows the angular position α of a treatment station BS on a transport element 3, 4 during the course of two complete revolutions as a function of time. The boundary between the first and second revolutions occurs when the angular position α transitions from 360 degrees back to zero degrees.

A transfer preferably takes place when a handover treatment station BS faces a receiving treatment station, as shown in FIG. 2. This occurs when the treatment station BS reaches a particular angle along its circular path, as shown in FIG. 2. The upper graph shows first and second expected transfer times T1, T2 corresponding to first and second revolutions of the transport element 3, 4.

In the lower graph in FIG. 8, the various vertical lines show times at which a measured signal indicated the occurrence of several transfers. The first set of vertical lines shows transfers of pucks 2 between first and second transport elements 3, 4. As is the usual case when multiple trials are shown, these lines cluster about a first average transfer time with some variance about that average.

Also shown in FIG. 8 is a first tolerance window TF1 that brackets the first expected transfer time T1. It is apparent that, on the average, the pucks 2 are being transferred prematurely from the first to the second transport element 3, 4.

Similar data can be seen for the transfer from the second to a third transport element 4, 4'. However, in this case, the transfers of the pucks 2 are occurring, on the average, within a second tolerance window TF2 that brackets the second expected transfer time TF2. Thus, these transfers are occurring at the correct times.

The evaluator 7 can use data as shown in the second graph to infer that the second and third transport elements 4, 4' are correctly synchronized and that the first and second transport elements 3, 4 are not synchronized correctly. From this, the evaluator 7 is able to infer that there are no defects in the actual transfer but that the difficulty arises from a lack of synchronous operation between the first and second transport elements 3, 4. The evaluator 7 thus issues a message indicating that an adjustment may be necessary to the first transport element 3 to correct this.

A benefit of the information from FIG. 8 is the knowledge that the sensor 5 only needs to capture a signal during a limited window of time. This reduces the quantity of data to be processed by the evaluator 7 and thus simplifies the task of evaluation.

The invention has been described heretofore by way of exemplary embodiments. It is understood that a large number of alterations or deviations are possible, without thereby departing from the inventive concept underlying the invention.

The invention claimed is:

1. A method comprising using an acoustic signal to monitor a transfer of a puck that is holding and centering a container during said transfer, said transfer being a transfer from a first transport-element to a second transport-element that follows said first transport-element along a transport direction, wherein monitoring said transfer comprises using a sensor to capture a first acoustic signal, said first acoustic signal having been generated by said transfer, said first acoustic signal being indicative of said puck having been received at a treatment station associated with said second transport-element, and evaluating a first electrical signal, said first electrical signal being representative of said first acoustic signal.

2. The method of claim 1, further comprising comparing said first electrical signal with a reference signal.

3. The method of claim 2, further comprising generating said reference signal in situ using a mean value based on having measured signals indicative of prior transfers of pucks between said first and second transport-elements.

4. The method of claim 3, wherein said signals that were used to generate said reference signal arose from having detected acoustic signals associated with transfers of different pucks between two treatment stations, and wherein said method comprises using said first sensor and a second sensor, said first and second sensors having been allocated to different ones of said two treatment stations.

5. The method of claim 3, wherein said signals that were used to generate said reference signal arose from having detected acoustic signals associated with transfer of the same puck through multiple treatment stations.

6. The method of claim 1, further comprising comparing values of said first electrical signal within a range with values of said reference signal within said range, said range being a specified range of times.

7. The method of claim 1, wherein said first electrical signal signal defines a spectrum of said first acoustic signal, wherein evaluating said first electrical signal comprises comparing said spectrum with a spectrum of a reference signal.

8. The method of claim 1, further comprising filtering said first electrical signal to form a filtered signal, wherein evaluating said first electrical signal comprises comparing said filtered signal with a reference signal.

9. The method of claim 1, further comprising filtering out at least one of background noise and fundamental component vibrations from said first electrical signal.

10. The method of claim 1, further comprising using a second sensor to capture a second acoustic signal, said first and second acoustic signals being captured within a time window of less than one second in width, wherein said first and second acoustic signals are captured at different treatment stations.

11. The method of claim 1, further comprising positioning said first sensor to detect an acoustic signal that originates from a range of angles that encompasses said treatment station and using said acoustic signals to detect an abnormality of said treatment station.

12. The method of claim 1, further comprising positioning said first sensor to capture an acoustic signal for each transfer of said puck as said puck traverses a container-treatment machine having multiple transport elements and using acoustic signals captured by said first sensor to to detect an abnormality in a holding and centering unit of said puck.

13. The method of claim 1, further comprising capturing a second acoustic signal after having captured said first acoustic signal.

14. The method of claim 1, further comprising, based at least in part on having evaluated said first electrical signal, providing a message indicative of a defect in said transfer and carrying out an action selected from the group consisting of modifying a process parameter associated with said treatment station and carrying out adjustment or maintenance of said puck.

15. An apparatus comprising a container-treatment machine that comprises a first transport-element, a second transport-element that follows said first transport-element along a transport direction so as to receive, from said first transport-element, a puck that is holding and centering a container, a transfer area disposed between said first and second transport elements, a sensor disposed in said transfer area, said sensor being configured to capture an acoustic signal that results from transfer of said puck between said transport elements, an evaluator configured to receive, from said sensor, a signal representative of said acoustic signal and to evaluate said signal to identify abnormalities that are indicative of defects detected during transfer of said puck, and treatment stations provided at said first and second transport-elements, each of said treatment stations being configured to receive a puck, to treat a container held and centered by said puck, and to release said puck following completion of said treatment.

16. The apparatus of claim 15, wherein said sensor remains stationary during movement of said transport elements and wherein said sensor is arranged at said transfer area.

17. The apparatus of claim 16, wherein said sensor is configured to generate an electrical signal in response to a pressure wave that is present in said transfer area, said pressure wave having been caused by said transfer.

18. The apparatus of claim 16, wherein said sensor is configured to detect an optical signal that has been reflected from a structure in said transfer area, wherein said optical signal has a wavelength that has been altered in response to a vibration borne by said structure, said vibration being a result of said transfer.

19. The apparatus of claim 15, wherein said sensor is allocated to a set that comprises at least one treatment station and moves with a transport element that carries said set.

20. The apparatus of claim 19, wherein said sensor is disposed on a component of said treatment station inside said treatment station.

21. The apparatus of claim 15, further comprising a filter, wherein said signal representative of said acoustic signal has been passed through said filter, wherein said filter is configured to suppress selected frequencies.

22. The apparatus of claim 15, wherein said sensor detects structure-borne vibrations.

23. The apparatus of claim 15, wherein said sensor detects air-borne vibrations.

24. The apparatus of claim 15, further comprising a central evaluator that evaluates both said signal representative of said acoustic signal and another signal representative of another acoustic signal that was captured by another sensor.

25. The apparatus of claim 15, wherein said treatment stations provided at said first and second transport-elements comprise printing stations for ink-jet printing on containers.

* * * * *